United States Patent [19]

Schonbrun

[11] 3,876,839

[45] Apr. 8, 1975

[54] BATTERY FEED AND RING TRIP CIRCUIT

[75] Inventor: Leslie D. Schonbrun, Fort Washington, N.Y.

[73] Assignee: E & M Communications Corporation, New York, N.Y.

[22] Filed: Mar. 23, 1973

[21] Appl. No.: 344,096

[52] U.S. Cl. .......... 179/18 HB

[51] Int. Cl. .......... H04m 3/04

[58] Field of Search .......... 179/18 HB, 18 F

[56] References Cited

UNITED STATES PATENTS

| | | | |
|---|---|---|---|
| 3,218,394 | 11/1965 | Winkelman | 179/18 HB |
| 3,749,846 | 7/1973 | Young | 179/84 R |

*Primary Examiner*—Thomas W. Brown

*Attorney, Agent, or Firm*—Hubbell, Cohen, and Stiefel

[57] ABSTRACT

A battery feed and ring trip relay circuit for a telephone system in which "tripping" of the ringing signal is accomplished using only the battery feed and ringing relays, with the battery feed relay providing both a ring trip function and a battery feed function and with one coil of a pair of coils comprising the battery feed relay providing both a holding coil function and an operating coil function depending on the state of the ringing relay.

4 Claims, 1 Drawing Figure

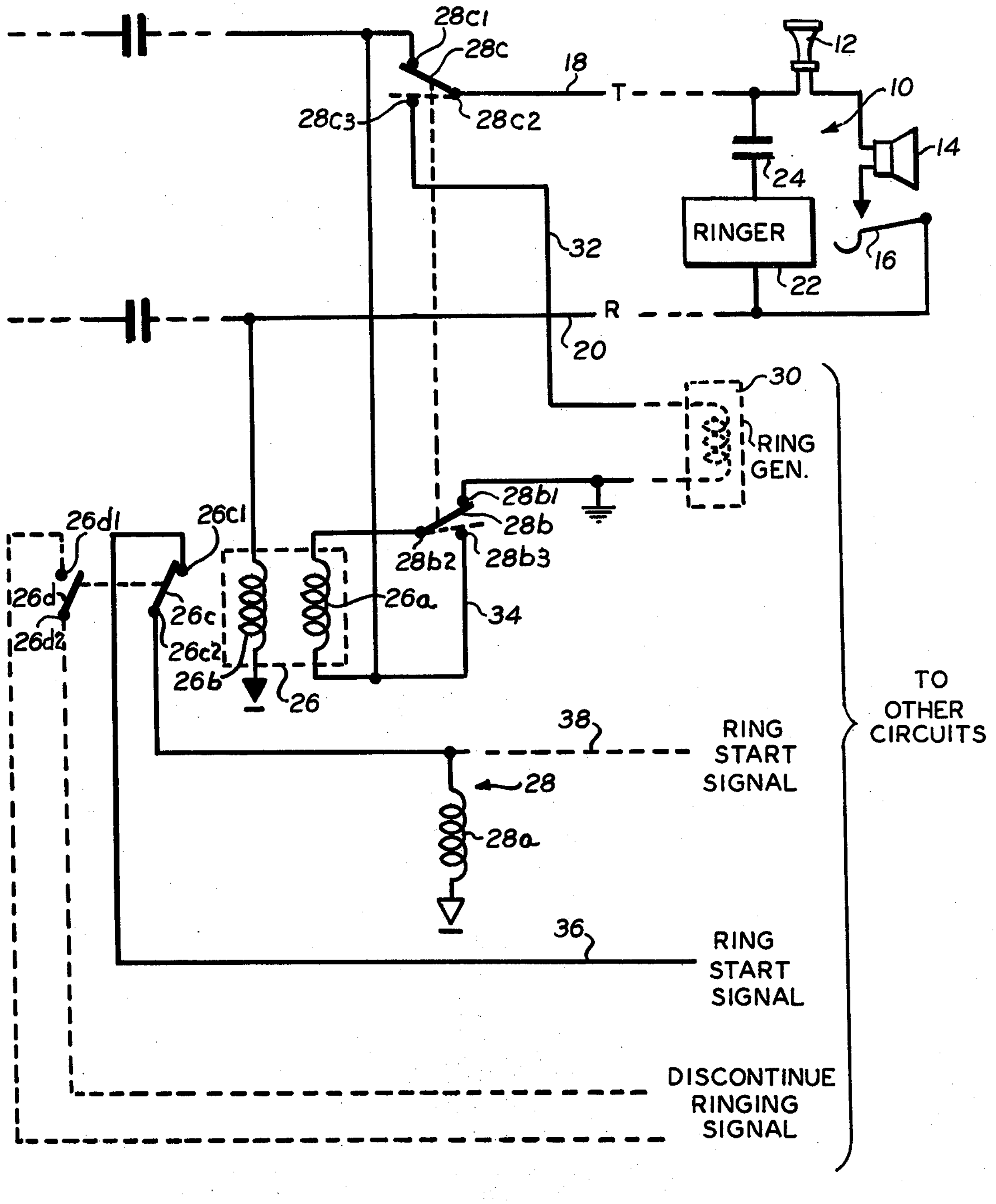
28c1
28c
18
T
12
10
14
28c3
28c2
24
RINGER
16
32
22
R
20
30
RING GEN.
28b1
28b
26d1
26c1
28b2
28b3
26d
26c
26a
34
26d2
26c2
26b
26
38
RING START SIGNAL
TO OTHER CIRCUITS
28
28a
36
RING START SIGNAL
DISCONTINUE RINGING SIGNAL

BATTERY FEED AND RING TRIP CIRCUIT

BACKGROUND OF THE INVENTION

1. Field of the Invention

The present invention relates to telephone systems and in particular to the battery feed and ringing circuit of a called party or switchboard wherein a ringing signal must be tripped when the called party answers.

2. Description of the Prior Art

In conventional two wire telephone systems, battery (negative) voltage is connected to one of the wires, which is normally designated the R wire, and ground or positive voltage is connected to the other wire, which is normally designated as the T wire. When, for example, the line is "seized" by lifting the telephone hand set, a resistive connection is made between the T and R wires to energize a battery feed relay which indicates, through suitable contacts, that the line is "requesting" service. On an incoming call to the telephone apparatus, a ringing relay is normally energized. This relay through its associated contacts, disconnects one wire of the line from the battery feed relay and connects that wire to a source of ringing current, such as a ringing generator. The ringing current activates a call signal until the subscriber answers or the telephone apparatus is seized to provide a loop closure. In such prior art circuits, a separate ring trip relay responsive to the loop current is normally energized in order to deenergize the ringing relay and to reconnect the telephone line through the battery feed relay to signal that a call has been answered. Some prior art circuits have eliminated the separate ring trip relay by utilizing a battery feed relay to perform both the battery feed function and the ring trip function. However, such prior art systems require that such a battery feed relay comprise at least three relay coils, one of the coils being a holding coil to insure that the battery feed relay is maintained energized during the transitional when the ringing relay is deenergized. Such a prior art system also requires a complex arrangement of switches operated by a ringing relay as well as additional switches operated by the battery feed relay. Thus, prior art ring trip relay circuits contain unnecessary circuitry, such as separate ring trip relay or additional relay coils and associated switches to perform the battery feed and ring trip functions resulting in increased costs and inefficient operation. The present invention overcomes these disadvantages of the prior art without any loss of function or sacrifice as to reliability and performance.

SUMMARY OF THE INVENTION

The present invention is directed to an improved battery feed and ring trip relay circuit for a telephone system comprising a telephone apparatus, a ringing current source, a ground line and a battery line, a battery source, a battery feed relay means and a ringing relay means wherein the battery feed relay provides both a ring trip function and a battery feed function and one coil of a pair of relay coils comprising the battery feed relay provides both a holding coil function and an operating coil function. The ringing relay means includes a relay coil means and a plurality of transfer contacts with the transfer contacts including first and second ganged selection means transferable between a first contact position and a second contact position. The ganged selection means has an associated transfer time between the first and second contact positions. The battery feed relay means, as previously mentioned, includes a pair of relay coils with the ganged selection means operatively connecting the pair of battery feed relay coils together in a holding path in the first contact position thereof and operatively connecting one of the pair of battery feed relay coils to the battery source in an operating path in the second contact position thereof. The battery feed relay and the ringing relay each have an associated release time between an energized state and a deenergized state. The ringing relay selection means transfer time is preferably at most 25% of the battery feed relay release time and, most preferably, is less than 25% of the battery feed relay release time. The holding path comprises the one battery feed relay coil operatively connected to the battery wire which is in turn operatively connected through the telephone apparatus to the ground line and, therefrom, through one of the ganged selection means pair to the other battery feed relay coil and, therefrom, through the other of the ganged selection means pair to ground. The operating path comprises the battery source operatively connected through the one battery feed relay coil to the battery wire which is in turn operatively connected throught the telephone apparatus to the ground line and, therefrom, through the previously mentioned one of the ganged selection means pair to the ringing current source and, therethrough, to ground. The selection means is in the first contact position when the ringing relay is deenergized with the battery feed relay remaining energized during the transfer time through the holding path, the battery feed relay thereafter becoming deenergized so that both the battery feed relay and the ringing relay are deenergized in a steady state condition of the circuit.

BRIEF DESCRIPTION OF DRAWING

The single FIGURE is a schematic diagram of the preferred embodiment of the present invention.

DETAILED DESCRIPTION OF THE PREFERRED EMBODIMENT

Referring now to the drawing, a telephone apparatus, generally referred to by the reference numeral 10, is diagrammatically shown. This telephone apparatus 10 preferably comprises a transmitter portion or microphone 12, a receiver or speaker portion 14, and a conventional hook switch 16 which is normally closed when the telephone hand set, normally containing the transmitter 12 and receiver 14, is removed from the cradle therefor normally provided. As shown, the telephone system is preferably a two wire telephone system in which a ground line 18 labeled "T" and a battery line 20 labeled "R" are provided. The call circuit for the telephone system illustrated in the FIGURE, preferably includes a conventional ringer 22 and a capacitor 24 which are connected together in a series branch across the telephone set 10. In addition, the telephone system also preferably includes a battery feed relay 26 which preferably comprises a pair of relay coils **26*a* and 26*b*. As will be described in greater detail hereinafter, coils 26*a* and 26*b* are preferably the usual balanced coils of a conventional battery feed relay, with coil 26*b* serving as both a holding coil and an operating coil in accordance with the present invention. The telephone system also preferably includes a ringing relay 28 comprising ringing relay coil 28*a* and transfer contact selection means 28*b* and 28*c*** which, as shown and preferred, are ganged together and controlled by relay coil 28*a* of the ringing relay 28. Preferably, ringing relay 28 is a transfer contact relay having a transfer time which is at most 25% of the release time of the battery feed relay 26 and, most preferably, is less than 25% of the battery feed relay 26 release time. The transfer contact of the ringing relay 28 are designated 28*c*1 28*c*2 and 28*c*3 for selection means 28*c* and 28*b*1 28*b*2 and 28*b*3 for ringing relay selection means 28*b*. Most preferably, the transfer time of the ringing relay 28 ganged selection means 28*c*–28*b*, which is defined as the time for the selection means 28*c* and 28*b* to transfer from contact position 28*c*1–28*c*2 to 28*c*2–28*c*3 selection means 28*c* and between 28*b*1–28*b*2 and 28*b*2–28*b*3 for selection means 28*d*, is less than 5 milliseconds and the battery feed relay 26 release time is preferably 25 milliseconds. In this manner, as will be described in greater detain hereinafter, the timing of the circuit is such that during the release of the ringing relay 28 which causes the selection means 28*c*–28*b* to switch from one contact to the other contact position, the battery feed relay 26 does not have time to release. Typically by way of example, the ringing relay 28 could be an XWK 55 type, manufactured by Oki Electronics, of Japan.

Except as described in the following, the operation of the telephone system including the battery feed and ringing relays is conventional and, in order to simplify the description of the invention, the standard battery feed and ringing relay circuit have not been illustrated. The selection means or switch means operated by the battery feed relay 26 are designated 26*c* and 26*d* respectively with the associated relay contacts being designated 26*c*1 and 26*c*2 for switch 26*c* and 26*d*1 and 26*d*2 for switch 26*d*. For purpose of illustration, all relay contacts for both the ringing relay 28 and the battery feed relay 26 are illustrated in the steady state condition of the circuit which is the condition which the associated relay coils 28*a* and 26*a* and 26*b* are all deenergized.

Preferably, ringing relay selection means 28*c* and associated transfer contacts 28*c*1, 28*c*2 and 28*c*3, are adapted to open the ground telephone line 18 when the ringing relay 28 is energized and to connect the ground line 18 to a source of ringing current, such as a conventional ringing generator 30, via path 32. The other ringing relay selection means 28*b* which is preferably ganged to selection means 28*c*, and includes transfer contacts 28*b*1, 28*b*2 and 28*b*3, preferably disconnects one side of the battery feed relay coil 26*a* from ground and creates a short circuit via path 34 around the coil 26*a* which preferably functions as an anti-chattering circuit as described below.

Battery feed relay coil 26*b* is preferably connected between a negative battery source (not shown) and battery line 20. This results in energization of the battery feed relay 26 when the telephone is answered, that is when switch 16 is closed. Battery feed relay switch 26*c* and associated contacts 26*c*1 and 26*c*2 are preferably connected in the energizing circuit for ringing relay 28 coil 28*a* in order to deenergize the ringing relay 28 immediately upon seizure of the telephone line. If desired, an additional switch 26*d* ganged to switch 26*c* may be provided with additional contacts 26*d*1 and 26*d*2 in order to transmit a signal to other equipment which, in turn, will de-energize ringing relay 28 when desired in lieu of switch 26*c* and associated contacts 26*c*1 and 26*c*2.

The operation of the circuit is as follows. When the circuit is idle, that is, no conversation is in progress and the connected party or equipment is not being rung, ground appears on the ground line 18 via battery feed coil 26*a* and ringing relay contacts 28*b*1 and 28*b*2 through switch 28*b*. No current flows in the circuit because the hook switch 16 is in the open position. If the telephone apparatus seizes the line such as by closure of switch 16 when the hand set is lifted, a resistive connection is provided between the ground line 18 and the battery line 20 through the transmitter 12 and receiver 14. This causes current to flow in the battery feed relay coils 26*a* and 26*b* to energize the relay 26. Battery feed relay 26 then povides suitable signals to contacts (not shown) to indicate that the line is in use. In conventional fashion, the current flowing in the loop provides the transmitter current and interruptions of such current by a dial provide the dialing signals to be transmitted through the system. Battery feed relay coils 26*a* and 26*b* are preferably of equal resistance and turns so that the telephone line is balanced against interference from outside potentials. When the call has been completed, and the hand set has been replaced in its cradle, switch 16 is opened which opens the loop to deenergize the battery feed relay 26, which then signals that the call has terminated and the line is free.

When it is desired to call the subscriber, the ringing relay 28 is energized by conventional equipment (not shown) in conventional fashion. For example, ringing relay 28 may be energized by the presence of a signal on lines 36 and 38. The ring start signal on line 36 is preferably coupled through the normally closed battery feed contacts 26*c*1 and 26*c*2 to the ringing relay coil 28*a*. Due to the preferably selected transfer time of ringing relay 28, when the ringing relay coil 28*a* is energized ganged selection means 28*c* and 28*b* transfer to the contact position indicated by the dotted lines between contacts 28*c*2–28*c*3 for 28*c* and 28*b*2–28*b*3 for switch 28*b*. Selection means 28*c* in transferring to contact position 28*c*3–28*c*2 opens the ground line 18 to the telephone set and connects it instead to the source of ringing current 30 on line 32. This ringing current is preferably an alternating current which is not blocked by capacitor 24 and, therefore, is coupled across battery feed relay coil 26*b*, the direct current path through the telephone set 10 remaining open by virtue of switch 16. Although the alternating ringing current will not energize the battery feed relay 26, preferably, it can cause "chattering" of the relay contacts. To prevent this, the battery feed relay coil 26*a* is preferably short circuited via path 34 by transfer of the ganged ringing relay selection means 28*b* to contact position 28*b*3–28*b*2, the short circuit preventing the relay contacts from chattering.

When the call is answered, switch 16 is closed to complete a direct current path between the ground line 18 and battery line 20. This energizes battery feed relay coil 26*b* through the telephone set 10, ringing relay contacts 28*c*3–28*c*2 and the ringing circuit via path 32 to ground. When battery feed relay 26 is energized, switch 26*c* through connecting contacts 26*c*1 and 26*c*2, or switch 27*d* through connecting contacts 26*d*1 and 26*d*2, opens the energizing circuit for ringing relay coil 28*a*. Because of the preferred relationship between the ringing relay transfer time and the release time of the battery feed relay 26, when ringing relay 28 is deenergized, battery feed relay coil 26*b* is connected in a holding path via path 20, through hook switch 16, receiver 14 and transmitter 12, to the ground line 18, between contacts 28_c_2 and 28_c_1 via switch or selector means 28_c_, and therefrom through battery feed relay coil 26_a_ to ringing relay contacts 28_b_2 and 28_b_1 via selection means 28_b_ to ground. In the position when the ringing relay coil 28_a_ is energized, the battery feed relay coil 26_b_ is connected in an operating path from the battery negative source to the coil 26_b_ to path 20, therefrom, through switch 16 to receiver 14 and therefrom to transmitter 12, therefrom to ground line 18 and through ringing relay contacts 28_c_2–28_c_3 via selection means 28_c_ and, therefrom via path 32 through ringing generator 30 to ground. Thus, battery feed relay coil 26_b_ serves as both a holding coil and an operating coil depending on the state of the ringing relay coil 28_a_ and the result contact position of the selection means 28_c_ and 28_b_. Thus, when the ringing relay 28 is deenergized, its contacts return to the illustrated condition and during the transfer time the battery feed relay 26 is maintained energized by the above described direct current path through the coils 26_b_ and 26_a_. Thereafter, the battery feed relay 26 becomes deenergized to return the circuit to the steady state condition.

It should of course be understood that the invention is not limited to any particular environment. It may be used in trunk circuits, link circuits, intra-office trunk circuits, adapter circuits, inter-face circuits of telephone exchangers, private branch exchanges, private telephone systems, inter-communications systems, telephone equipment located on customer premises, and, generally any type of telephone system where battery and ground must be fed to a telephone line and a ringing signal trip by seizure of a line to provide a loop closure either directly or through other apparatus. The additional functions provided by the battery feed and ringing relays are not material to the invention which would also have utility where helper relays are provided for these relays.

I claim:

1. In a battery feed ring trip circuit for a telephone system comprising a telephone apparatus, a ringing current source, a ground line and a battery line, a battery source, a battery feed relay means and a ringing relay means, the improvement wherein said ringing relay means comprises a transfer contact relay means including a relay coil means and a plurality of transfer contacts, said transfer contacts including first and second ganged transfer contact selection means transferable between a frist transfer contact position and a second transfer contact position, said ganged transfer contact selection means having an associated transfer time between said first and second transfer contact positions; and said battery feed relay means includes a pair of relay coils, said ganged transfer contact selection means operatively connecting said pair of battery feed relay coils together in a holding path in said first transfer contact position and operatively connecting a common one of said pair of battery feed relay coils to said battery source in an operating path in said second transfer contact position, said battery feed relay means and said ringing relay transfer contact relay means each having an associated release time between an energized state and a deenergized state, said ringing relay transfer contact selection means transfer time being at most 25% of said battery feed relay release time, said holding path comprising said one common battery feed relay coil operatively connected to the battery wire which is operatively connected through the telephone apparatus to the ground line and therefrom through one of said ganged transfer contact selection means pair to the other battery feed relay coil and therefrom through the other of said ganged transfer contact selection means pair to ground, said operating path comprising said battery source operatively connected through said one common battery feed relay coil to the battery wire which is operatively connected through the telephone apparatus to the ground line and therefrom through said one of said ganged transfer contact selection means pair to said ringing current source and therethrough to ground, said transfer contact selection means being in said first transfer contact relay means position when said ringing relay transfer contact is deenergized, said battery feed relay means remaining energized during said transfer time through said holding path, said battery feed relay means thereafter becoming deenergized, both said battery feed relay means and said ringing relay transfer contact relay means being deenergized in a steady state condition of said circuit, whereby said battery feed relay means provides both a ring trip function and a battery feed function and said one common coil of said battery feed relay pair provides both a holding coil function and an operating coil function.

2. A circuit in accordance with claim 1 wherein said ringing relay transfer contact selection means transfer time is less than 25% of said battery feed relay release time.

3. A circuit in accordance with claim 1 wherein said ringing relay transfer contact selection means transfer time is less than 5 ms and said battery feed relay release time is substantially 25 ms.

4. A circuit in accordance with claim 1 further including a normally open anti-chattering short circuit associated with the other of said battery feed relay coils, said other of said ganged transfer contact selection means pair closing said anti-chattering short circuit for said other battery feed relay coil means in said second transfer contact position thereof, said transfer contact selection means being in said second transfer contact position when said transfer contact ringing relay means is in said energized state, whereby chattering of the battery feed contacts is minimized.

* * * * *